United States Patent
Wakabayashi

(10) Patent No.: US 6,643,342 B1
(45) Date of Patent: Nov. 4, 2003

(54) UNIQUE WORD DETECTION CIRCUIT

(75) Inventor: Yasuhiko Wakabayashi, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/351,189

(22) Filed: Jul. 12, 1999

(30) Foreign Application Priority Data

Jul. 15, 1998 (JP) .......................................... 10-200854

(51) Int. Cl.$^7$ ................................................ H04L 7/00
(52) U.S. Cl. ........................ 375/364; 375/365; 370/514
(58) Field of Search ................................ 375/368, 340, 375/362–365, 367, 343; 370/503, 511–515

(56) References Cited

U.S. PATENT DOCUMENTS

| | | | | |
|---|---|---|---|---|
| 5,007,088 A | * | 4/1991 | Ooi et al. ...................... | 380/46 |
| 5,526,297 A | * | 6/1996 | Snyder, Jr. et al. ......... | 375/368 |
| 5,550,833 A | * | 8/1996 | Fujisawa ...................... | 370/514 |
| 5,708,682 A | * | 1/1998 | Nawata ........................ | 375/326 |
| 5,717,761 A | * | 2/1998 | Yatagai ........................ | 380/261 |
| 5,886,999 A | * | 3/1999 | Kojima et al. .............. | 714/708 |
| 6,272,335 B1 | * | 8/2001 | Nakayama et al. ......... | 455/422 |
| 6,317,441 B1 | * | 11/2001 | Nakajima ................... | 370/509 |
| 6,373,899 B1 | * | 4/2002 | Krasner ...................... | 375/259 |

FOREIGN PATENT DOCUMENTS

| | | |
|---|---|---|
| JP | 56-8916 | 1/1981 |
| JP | 4-177931 | 6/1992 |
| JP | 6-204979 | 7/1994 |
| JP | 7-15423 | 1/1995 |
| JP | 9-23221 | 7/1999 |

OTHER PUBLICATIONS

Japanese Office Action issued May 9, 2000 in a related application with English translation of relevant portions.

* cited by examiner

*Primary Examiner*—Tesfaldet Bocure
*Assistant Examiner*—Kevin M Burd
(74) *Attorney, Agent, or Firm*—Dickstein, Shapiro, Morin & Oshinsky, LLP.

(57) ABSTRACT

In the present invention, UW gate signal generator generates a UW gate signal for detecting a unique word. Gate circuit masks received signal using UW gate signal. PN detector compares a preset unique word signal set value and the signal output from inverting circuit during the active-high interval of UW gate signal, detects whether or not they are matching, and outputs the result. UW detector compares a preset unique word signal set value and the signal output from gate circuit during the active-high interval of UW gate signal, and outputs UW detection signal. Error detector outputs a detection stop signal for stopping unique word detection based on the signals output from PN detector and UW detector.

7 Claims, 7 Drawing Sheets

UNIQUE WORD DETECTION CIRCUIT

BACKGROUND OF THE INVENTION

1. Field of the Invention

The present invention relates to a unique word detection circuit suitably employed when establishing frame synchronization by applying time division multiple access to the reverse line from a base station to a mobile station. In particular, the present invention relates to a unique word detection circuit that employs a PN (pseudo noise) pattern repeat preamble signal.

This application is based on Japanese Patent Application No. Hei 10-200854, the contents of which are incorporated herein by reference.

2. Background Art

In data transmission such as performed in a 2.4 GHz band wireless LAN (local area network) system, it has been the conventional practice to employ a means for detecting a unique word included in the received signal when establishing frame synchronization. The frequency bandwidth which can be employed in this type of system is restricted, and a spectrum spread system is employed because the frequency band is shared in common with that used by ISM (industrial scientific and medical equipment) band microwave ranges, medical equipment and the like. An explanation will be made using as an example IEEE 802.11 (The Institute of Electrical and Electronic Engineers, Inc. 802.11), the international standard method for this wireless LAN.

FIG. 6 is a block diagram for explaining an example of the structure of a IEEE 802.11 unique word detection circuit according to the conventional technology. The wireless LAN receiving device shown in FIG. 6 is composed of an antenna 8, radio 9, inverse spread device 10, and UW detector (unique word detector) 11. The receiving device in FIG. 6 receives data transmitted from a base station via antenna 8. The data received from antenna 8 undergoes frequency conversion at radio 9, and is output to inverse spread device 10. Inverse spread device 10 determines the self-interaction correlation value, and outputs a received data signal (F) to UW detector 11. UW detector 11 compares sequentially output received data signals (F) with a preset 16 symbol unique word pattern. If there is a match between a received data signal (F) and the preset unique word pattern, UW detector 11 outputs a 1 pulse UW detection signal (G). Frame synchronization is established based on this one pulse signal at the receiving device, and data uptake begins.

The preamble portion of the received signal in IEEE 802.11 is designed such that there is a 192 symbol signal attached to the head for the purpose of establishing synchronization at each burst. A 16 symbol long unique word pattern is also present at a predetermined position in the preamble signal array.

FIG. 7 is a timing diagram showing an example of the operation for detecting the unique word under normal reception at the receiving device shown in FIG. 6 in IEEE 802.11 according to the conventional technology. UW detector 11 compares the 16 symbol unique word that is included in the 192 symbol preamble signal array present in the received data signals (F) that are being sequentially output from inverse spread device 10, with a preset 16 symbol unique word pattern. When a match occurs, UW detector 11 outputs a 1 pulse UW detection signal (G).

FIG. 8 is a timing diagram showing an example of the operation for detecting a unique word during abnormal reception in IEEE 802.11 according to the conventional technology. When an error occurs in the 16 symbol unique word in the 192 symbol preamble signal array that is attached to the head in received data signals (F) that are being sequentially output from inverse spread device 10 shown in FIG. 6, the results of the comparison with the 16 symbol unique word pattern will indicate non-matching. Accordingly, the 1 pulse detection signal is not output. UW detector 11 also performs a comparison on the information data. If the same pattern as the UW signal is present in the information data, a one pulse UW detection signal (G) is output. In other words, although the probability that the same unique word pattern signal will be present in the information data is small, if such a pattern is present, then an incorrect detection results.

Conventionally known technologies related to the present invention include a device such as disclosed in Japanese Patent Application, First Publication No. Hei 09-23221 for preventing incorrect detection of noise other than the unique word; a device such as disclosed in Japanese Patent Application, First Publication No. Hei 07-15423 for reducing the possibility that an aperture interval will be set at an incorrect position and reducing the rate of incorrect unique word detection; and a device such as disclosed in Japanese Patent Application, First Publication No. Sho 56-8916 for controlling the generation of the next aperture signal by setting the initial detection pulse to be the detection pulse for the true unique word, by means of stopping the aperture signal at the initial detection pulse.

In a conventional unique word detection method, it was necessary to lengthen the unique word in order to construct a system resistant to poor environmental conditions caused by noise, reflected waves and the like. However, transmission efficiency declines when the unique word is lengthened. Moreover, when an error occurs in the unique word signal in the preamble signal, a problem results in that a given pattern present in the information data that is the same as the unique word signal is detected in error.

SUMMARY OF THE INVENTION

The present invention was conceived in consideration of the above-described problems, and has as its objective the provision of a unique word detection circuit that can detect a unique word with excellent accuracy using a short unique word pattern, by employing a preamble signal that is a specified symbol repeat PN code, such as a 31 symbol repeat for example, and which can improve transmission efficiency and establish frame synchronization in a high-speed wireless communications system. It is a further objective of the present invention to provide a unique word detection circuit which can prevent incorrect detection of a unique word signal in the case where an error has occurred in the received data.

The present invention provides a correlation calculating processor for detecting the start of demodulated data in the received signal, and a unique word/gate signal generator for generating and outputting a gate signal for designating the time interval during which the unique word (UW) is detected based on the signal output by the correlation calculating processor. The present invention also provides a gate circuit for passing the received signal in a time interval based on the gate signal output from the unique word/gate signal generator, and an inverting circuit for inverting the signal output from the gate circuit. A pseudo noise (PN) detector compares the signal output from the inverting circuit with a predetermined unique word signal set value during the time interval in which the gate signal is being output from the unique word/gate signal generator, detects whether or not there is a match, and then outputs the results of the detection. A unique word detector compares the signal output from the gate circuit with a predetermined unique word signal set value during the time interval in which the gate signal is being output from the unique word/gate signal generator, and outputs the results of the comparison as the unique word detection signal. An error detector outputs a signal for halting unique word detection based on the signal output from the pseudo noise detector and the signal output from the unique word detector.

Further, the invention is characterized in that the received signal has a plurality of repeating pseudo noise codes consisting of a specific symbol number in the preamble signal of each burst, and in that a symbol indicating the predetermined unique word signal set value and a symbol indicating the value obtained by inverting the unique word signal set value are included respectively in at least two of the pseudo noise codes. Further, the invention is characterized in that the received signal has a plurality of repeating pseudo noise codes consisting of a specific symbol number in the preamble signal of each burst, and in that a symbol indicating the predetermined unique word signal set value is included in at least one pseudo noise code and a symbol indicating the value obtained by inverting the unique word signal set value is included in at least two or more pseudo noise codes.

Further, the invention is characterized in that the error detector outputs a signal for halting the unique word detection when the signal output from the pseudo noise detector indicates non-matching for the result of the comparison and the signal output from the unique word detector indicates non-matching for the result of the comparison. The invention is characterized in that the error detector outputs a signal for halting unique word detection when the signal output from the pseudo noise detector does not indicate a match for the result of the comparison, or when the signal output from the unique word detector does not indicate a match for the result of the comparison, during the time interval in which a gate signal is being output from the unique word/gate signal generator.

The present invention's unique word detection circuit enables detection using a short unique word signal by employing a preamble signal which is a 31 symbol repeat pseudo noise code. In the present invention's unique word detection circuit, the unique word can be detected by comparing a given UW pattern and PN pattern in the preamble signal of a 31 symbol repeat PN code, for example. As a result, the present invention resolves the problem of mistaken detection of a pattern in the information data that is the same as the unique word signal in the case where an error has occurred in the unique word signal in the preamble signal generated by a unique word detection circuit according to the conventional technology. The present invention further resolves the problem of reduced transmission efficiency due to the use of a long unique word.

The present invention restricts the time interval during which detection of a unique word is performed. As a result, it is possible to suspend detection of the burst signal when an error has occurred in the received data, so that incorrect detection of the same unique word pattern in the information data does not occur. In addition, by employing a preamble signal which is, for example, a 31 symbol repeat PN code, the present invention offers the effects of performing detection using a short unique word, reducing the transmission speed and decreasing the time required to establish synchronization. Moreover, in the present invention, it is possible to further prevent incorrect detection by mixing the unique word pattern and a pattern which is the inverse thereof in the preamble signal, or by making the pattern repeat number plural.

DETAILED DESCRIPTION OF THE PREFERRED EMBODIMENTS

Preferred embodiments of the present invention will now explained with reference to the accompanying figures. A 5 GHz band standardization has started for W-ATM (Wireless-Asynchronous Transfer Mode), a form of multimedia mobile communications capable of transferring a large amount of information. This W-ATM will be explained as an example.

Figure 1:
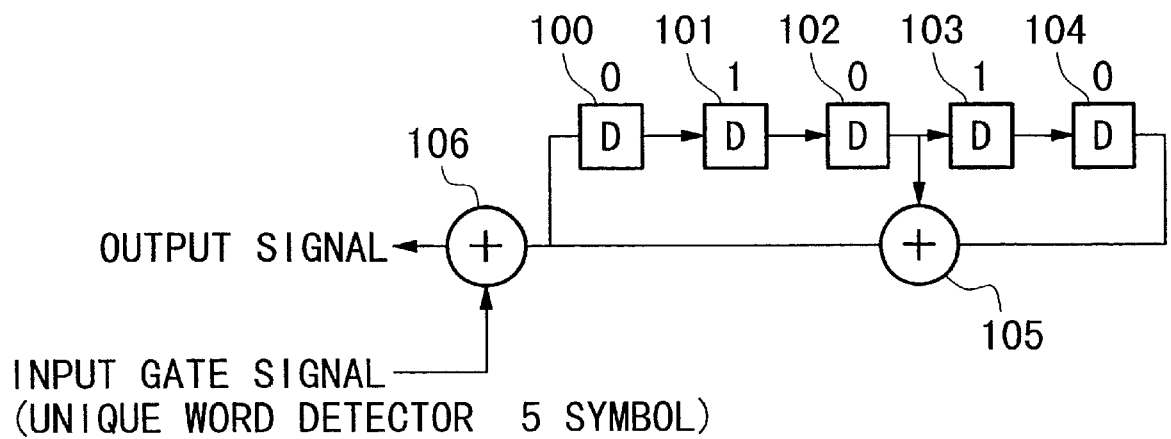
FIG. 1 is a block diagram showing an example of the structure of the preamble signal generator employed at the base station for realizing the present invention.
Figure 2:
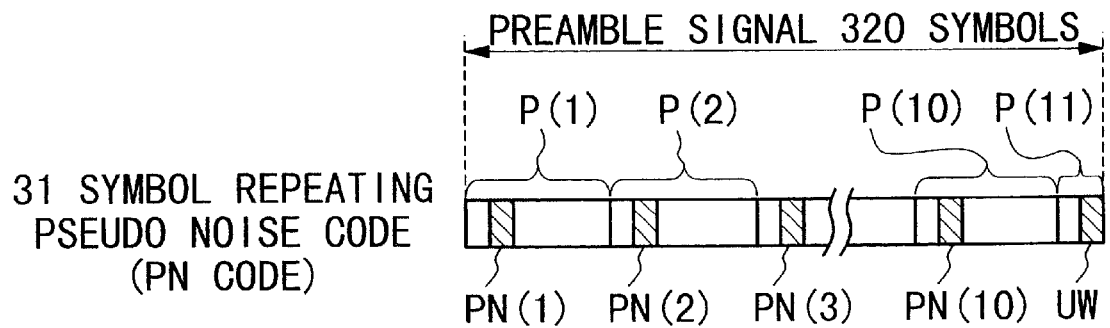
FIG. 2 is a timing diagram showing an example of the structure of the preamble signal that is employed for realizing the present invention.
Figure 6:
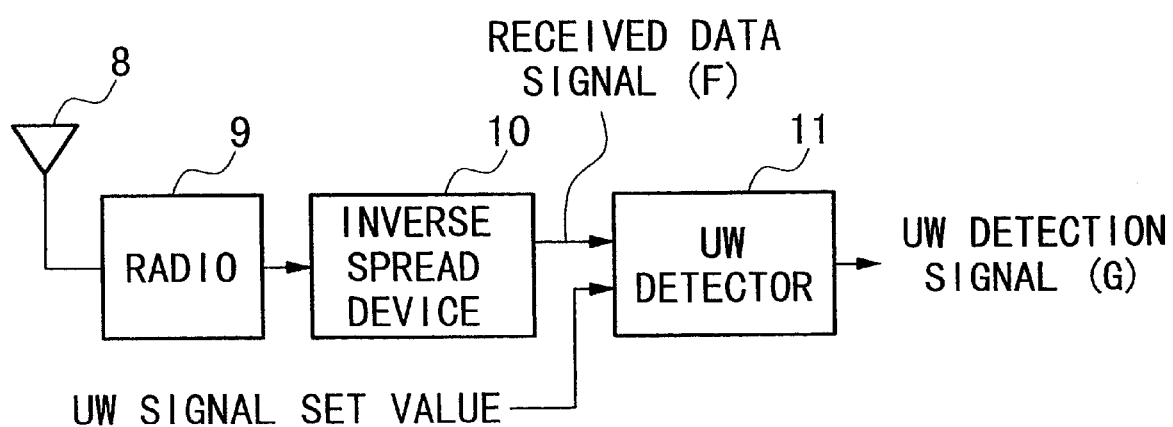
FIG. 6 is a block diagram for explaining a unique word detection circuit according to the conventional technology IEEE 802.11.
Figure 7:
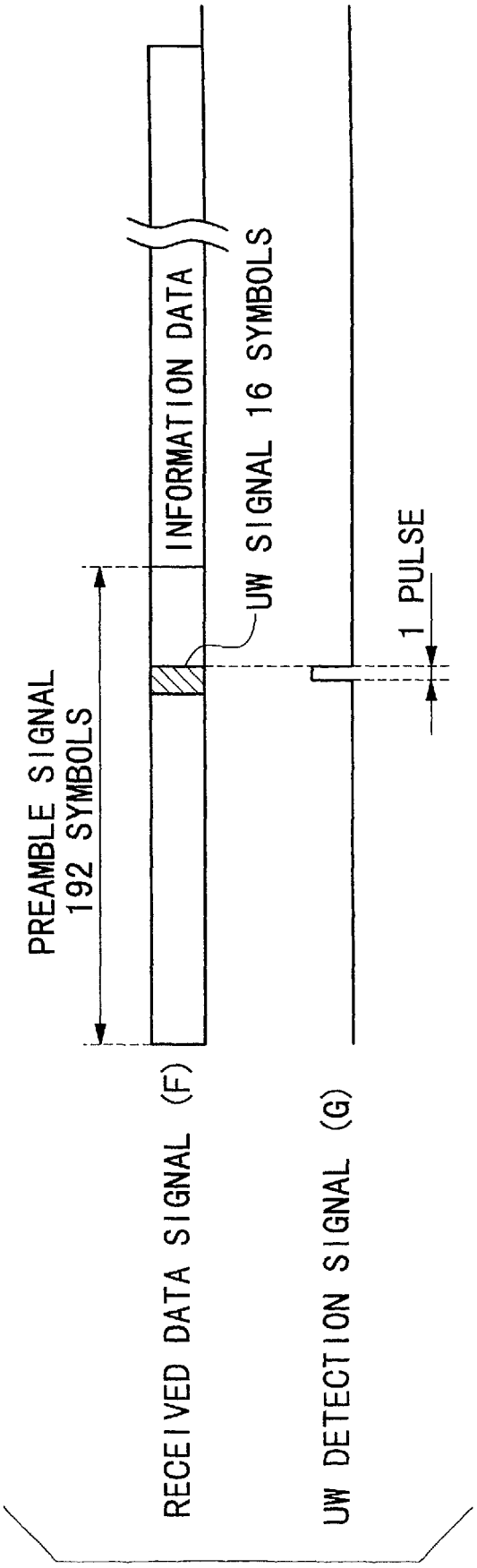
FIG. 7 is a timing diagram showing an example of the unique word detection operation during normal reception in the conventional technology IEEE 802.11.
Figure 8:
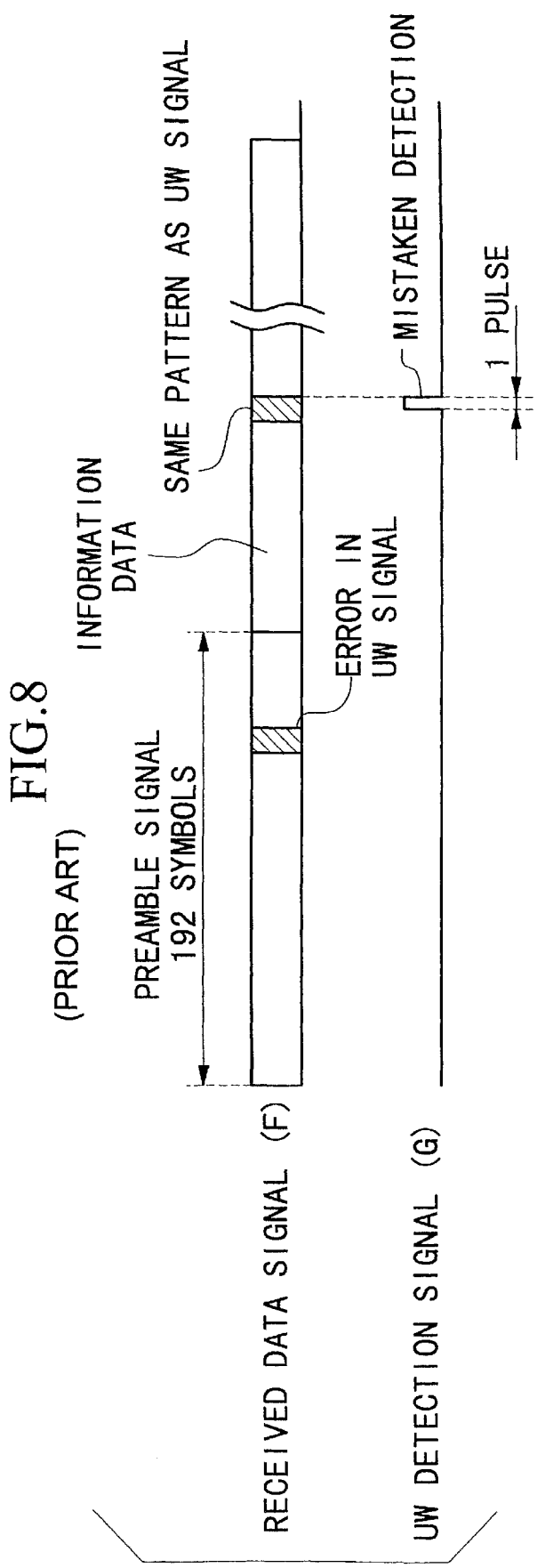
FIG. 8 is a timing diagram showing an example of the unique word detection operation during abnormal reception in the conventional technology IEEE 802.11.

With reference to FIGS. 1 and 2, an explanation will now be made of an example of the structure for generating the signal corresponding to the preamble portion, and the unique word included therein, of the transmission signal employed for operating the unique word detection circuit according to the present invention. An example of the generated signal will also be explained. Note that the unique word detection circuit shown in FIG. 3 is employed in place of the UW detector 11 in the receiving device such as shown in FIG. 6 for establishing frame synchronization in a system in which the reverse line from the base station to the mobile station is transmitted using time division multiple access.

FIG. 1 is a block diagram showing an example of the structure of the preamble signal generator for generating the preamble portion of the transmission signal that is employed in the present invention. The preamble signal generator is composed sequentially of five shift registers 100, 101, 102, 103 and 104 connected in cascade; a mod 2 adder 105 for adding the outputs of shift register 102 and shift register 104, and outputting the result obtained when an operation to multiply by 2 is performed to shift register 100 and adder 106; and an adder 106 with a selector for attaching five symbol data for detecting a predetermined unique word to the output from adder 105 and outputting the result at a specific timing. In this embodiment, a circuit of the type shown in FIG. 1 is employed to generate at the base station a signal consisting of a 31 symbol repeat pseudo noise code and a UW (unique word) pattern that is obtained by inverting the final five symbols. This signal is generated as the preamble signal that is attached to the head of one burst in order to detect the start of data uptake after establishing synchronization for each 1 burst. Frame synchronization can be established at the receiving device by detecting this unique word.

FIG. 2 is timing diagram showing an example of the structure of the preamble signal for realizing the present invention. The preamble length is 320 symbols and consists of a 31 symbol repeat PN code block (P(1))~(P(11)). 5 symbol PN patterns (PN(1))~(P(10)) are present in the PN code block (P(1))~(P(10)). The UW pattern (UW) is the result of inversion of the 5 symbol PN pattern (P(1))~(P(10)). In addition a 5 symbol UW pattern (UW) is present in the PN code block (P(11)).

Figure 3:
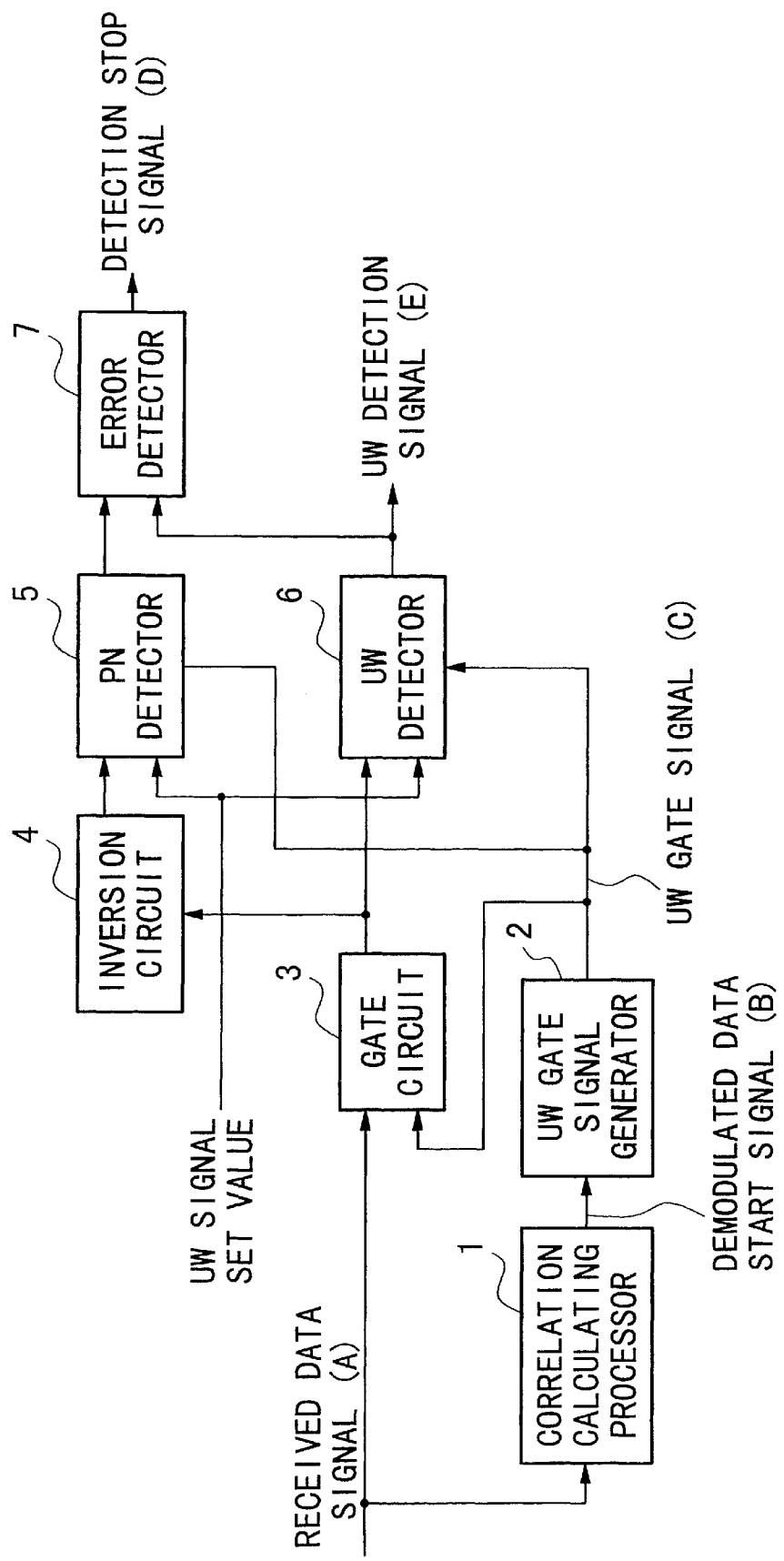
FIG. 3 is a block diagram shown an embodiment of the unique word detection circuit according to the present invention.

FIG. 3 is a block diagram showing an embodiment of the present invention's unique word detection circuit that is employed in a receiving device. The unique word detection circuit shown in FIG. 3 is formed of correlation calculating processor 1, UW (unique word) gate signal generator 2, gate circuit 3, inverting circuit 4, PN (pseudo noise) detector 5, UW detector 6, and error detector 7. Correlation calculating processor 1 outputs to UW gate signal generator 2 a demodulated data start signal (B) which is generated when the head of the 31 symbol repeat PN code block (P(1))~(P(10)) is detected in the preamble interval from the inputted received data signal (A), and is maintained until information data is complete. The PN code block (P(1))~(P(11) in the preamble signal at which start is initiated will vary depending on the onset of the carrier sense signal. Provided that UW gate signal generator 2 knows the head of the PN code block (P(1))~(P(11)), then the PN code block at which the PN pattern (PN(1))~(PN(10)) and UW pattern (UW) are present may be understood. The onset of modulated data start signal (B) is the trigger, and the 5 active-high UW gate signals (C) in the preamble interval are output to gate circuit 3, PN detector 5 and UW detector 6. PN detector 5 and UW detector 6 perform detection only during this time interval.

By masking the received data signal (A) using an AND circuit and employing the UW gate signal (C) from the UW gate signal generator 2, gate circuit 3 outputs the received data to inverting circuit 4 and PN detector 5 only during the time interval in which the UW gate signal is active-high. Inverting circuit 4 inverts the signal output from gate circuit 3 and outputs the result to PN detector 5.

PN detector 5 is selected for the detection active state only during the time interval in which UW gate signal (C) is active-high, and carries out the comparison of the preset five symbol unique word signal and the PN patterns (PN(1))~(PN(10)) in which the signal output from inverting circuit 4 has been latched. When the result of the comparison indicates a match, PN detector 5 performs a comparison with the sequentially following PN patterns (PN(2))~(PN(10)). In contrast, when the result of the comparison indicates nonmatching, PN detector 5 does not perform a comparison with the next PN pattern {PN (2), for example, when the comparison result was nonmatching at PN(1)}. When the result of the comparison indicates non-matching, PN detector 5 halts unique word detection with respect to this burst signal, and outputs a signal indicating that the comparison result indicates non-matching to error detector 7.

UW detector 6 is selected for the detection active state only during the time interval in which the UW gate signal (C) is active-high, and compares the UW pattern (UW), in which the signal output from gate circuit 3 is latched, with the preset 5 symbol unique word signal. When there is a match, UW detector 6 generates a 1 pulse UW detection signal (E) and outputs it to error detector 7. When the result of the comparison indicates non-matching, UW detector 6 outputs a signal indicating nonmatching to error detector 7.

When a PN pattern is not detected at PN detector 5 during the detection active interval and a UW pattern signal is not detected during the detection active interval at UW detector 6, i.e., if an error reception has occurred, then error detector 7 outputs a detection stop signal (D). Thus, by halting detection of the burst signal at the receiving device, it is possible to prevent a mistaken detection in the information data, etc.

Figure 4:
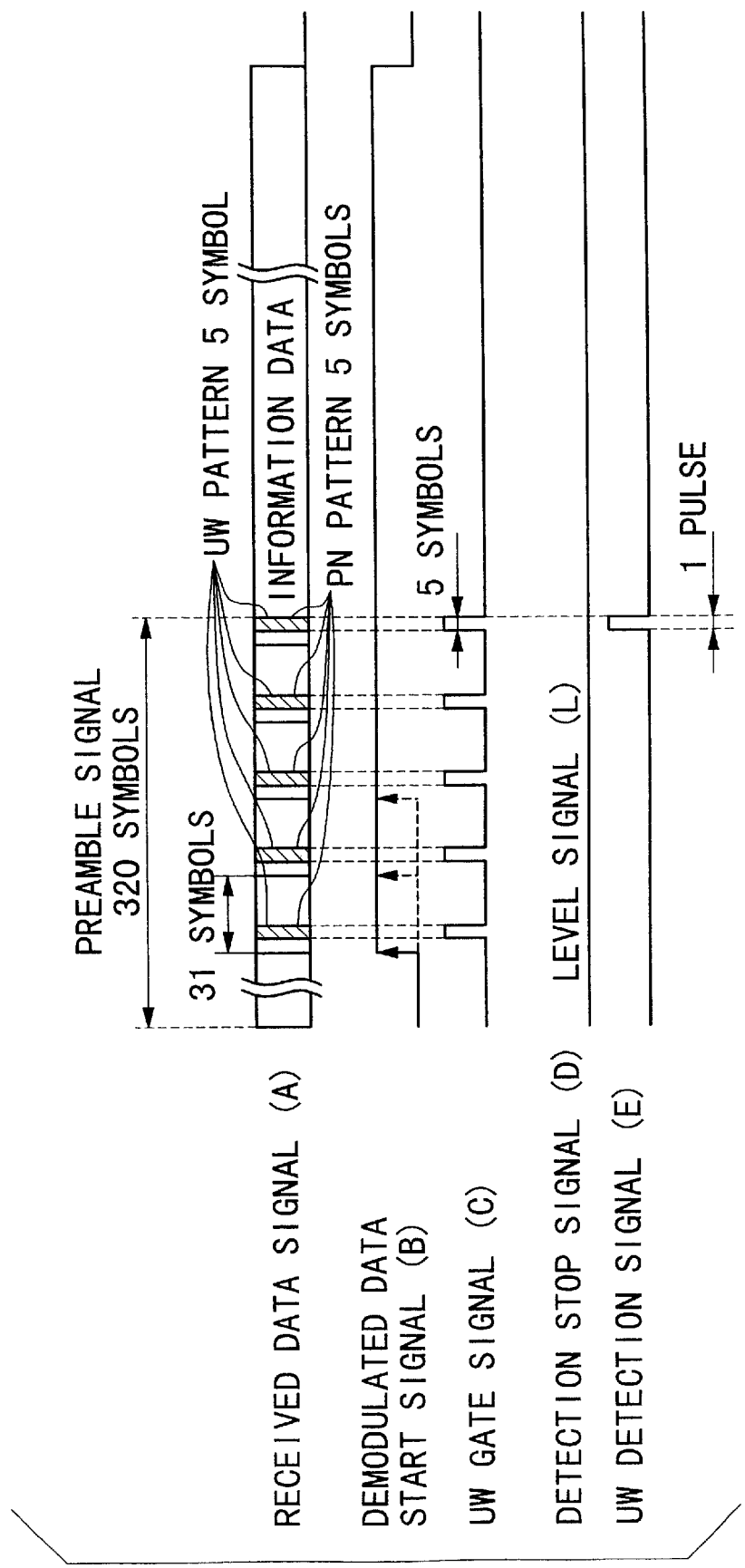
FIG. 4 is a timing diagram showing an example of the unique word detection operation in the unique word detection circuit shown in FIG. 3.

FIG. 4 is a timing diagram for showing an example of the unique word detection operation during normal reception in the unique word detection circuit shown in FIG. 3. A 5 symbol PN pattern (PN(l))~(PN(10)) and a UW pattern (UW) are attached to the sequentially output received data signal (A), in the 320 symbol preamble signal array. The demodulated data start signal (B) is started when the head of the 31 symbol repeating PN code block (P(1))~(P(11)) is detected, and is maintained until the information data is completed.

UW gate signal (C) is generated as a 5 symbol active-high gate signal for detecting PN pattern (PN(l))~(PN(10)) and UW pattern (UW), by the onset of demodulated data start signal (B). When the initial PN pattern (PN(l)) is the value which results when the preset 5 symbol unique word pattern is inverted, a comparison is performed on the following PN pattern (PN(2)). Continuing thereafter, when the result of the comparison indicates an inverted state, a comparison is made with the sequentially following PN pattern (~PN(10)). If the result of the comparison with the UW pattern (UW) at the final PN pattern (PN(11)) indicates a match, then a 1 pulse UW detection signal (E) is output. During normal reception, i.e., when an error has not occurred, the detection stop signal (D) is a low level signal.

Figure 5:
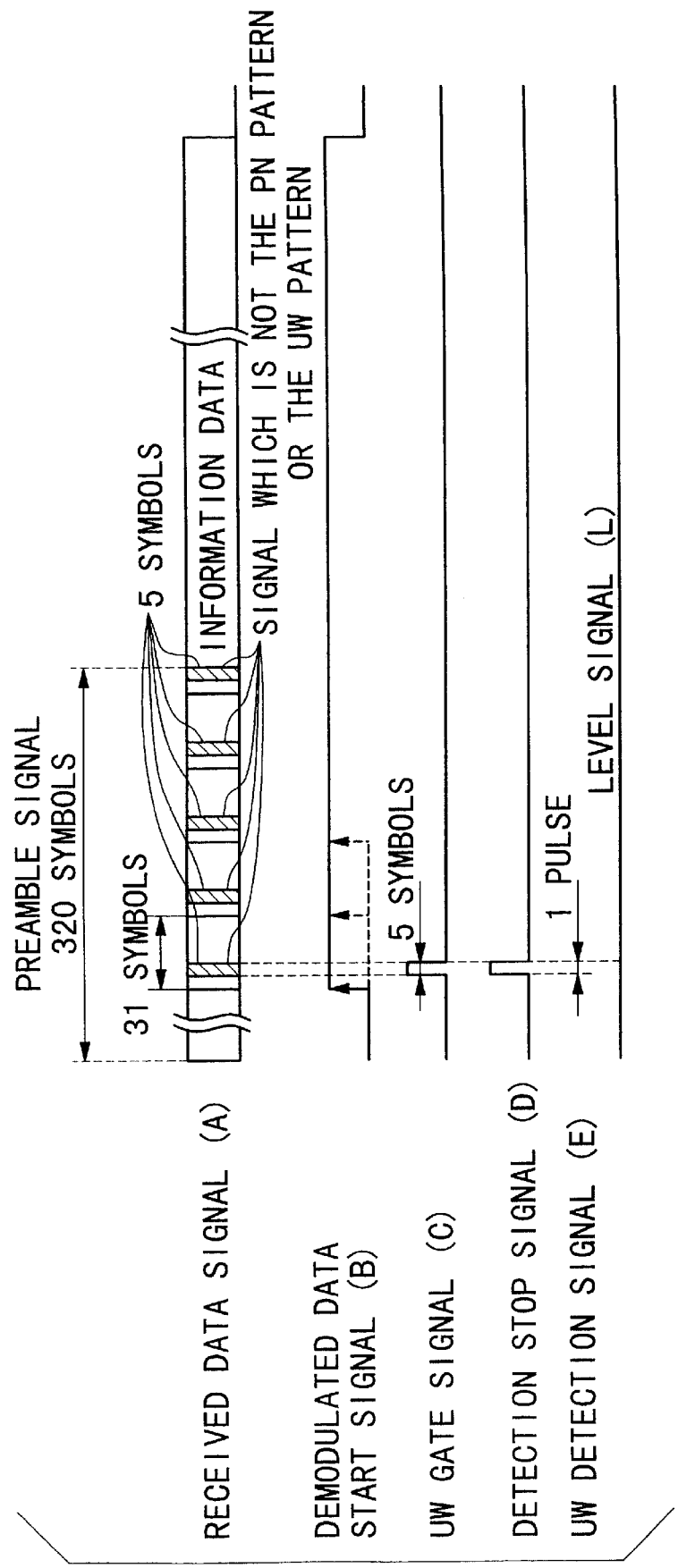
FIG. 5 is a timing diagram showing an example of the unique word detection operation in the unique word detection circuit shown in FIG. 3.

FIG. 5 is a timing diagram showing an example of the unique word detection operation at the unique word detection circuit shown in FIG. 3 during abnormal reception. When there is an error in the sequentially output received data signal (A), PN patterns (PN(1))~(PN(10)) are not inverted signals of the preset 5 symbol unique word pattern. Moreover, UW pattern (UW) is not the preset 5 symbol unique word pattern signal. When the result of the comparison between the preset 5 symbol unique word pattern and the initial PN pattern (PN(1)) is not inverted, a 1 pulse detection stop signal (D) is output for halting the unique word detection. Thus, by halting the detection of this burst signal, it is possible to prevent incorrect detection. In addition, UW detection signal (E) outputs a low level signal.

By comparing the PN patterns (PN(1))~(PN(10)) in a 31 symbol repeat PN code and a UW pattern (UW) in this way according to the preferred embodiments, it is possible to prevent the incorrect detection of a unique word pattern in information data which occurs in the conventional art. Moreover, by performing detection using a short unique word, it becomes possible to obtain the effects of increased transmission speed and reduced time required to establish synchronization.

This invention may be embodied in other forms or carried out in other ways without departing from the spirit thereof. The present embodiments are therefore to be considered in all respects illustrative and not limiting, the scope of the invention being indicated by the appended claims, and all modifications falling within the meaning and range of equivalency are intended to be embraced therein.

What is claimed is:

1. A unique word detecting circuit characterized in the provision of:

a correlation calculating processor for detecting the start of demodulated data in a received signal;

a unique word/gate signal generator for generating and outputting a gate signal for designating the time interval during which the unique word (UW) is detected based on the signal output by said correlation calculating processor;

a gate circuit for passing said received signal during a time interval based on the gate signal output from said unique word/gate signal generator;

an inverting circuit for inverting the signal output from said gate circuit;

a pseudo noise detector for comparing the signal output from said inverting circuit with a predetermined unique word signal set value during the time interval in which the gate signal is being output from said unique word/gate signal generator, detecting whether or not there is a match, and then outputting the results of the detection;

a unique word detector for comparing the signal output from said gate circuit with the predetermined said unique word signal set value during the time interval in which the gate signal is being output from said unique word/gate signal generator, and outputting the results of the comparison as the unique word detection signal; and an error detector for outputting a signal for stopping unique word detection based on the signal output from said pseudo noise detector and the signal output from said unique word detector.

2. A unique word detection circuit according to claim 1, wherein said received signal has a plurality of repeat pseudo noise codes consisting of a specific symbol number in the preamble signal of each burst, and a symbol indicating the predetermined unique word signal set value and a symbol indicating the value obtained by inverting the unique word signal set value are included respectively in at least two of the pseudo noise codes.

3. A unique word detecting circuit according to claim 1, wherein said received signal has a plurality of repeat pseudo noise codes consisting of a specific symbol number in the preamble signal of each burst, and a symbol indicating the predetermined unique word signal set value is included in at least one pseudo noise code and a symbol indicating the value obtained by inverting the unique word signal set value is included in at least two or more of the pseudo noise codes.

4. A unique word detecting circuit according to claim 2, wherein said error detector outputs a signal for stopping said unique word detection when the signal output from said pseudo noise detector indicates non-matching for the result of the comparison and the signal output from said unique word detector indicates nonmatching for the result of the comparison.

5. A unique word detecting circuit according to claim 2, wherein said error detector outputs a signal for stopping said unique word detection when the signal output from said pseudo noise detector does not indicate a match for the result of the comparison, or when the signal output from said unique word detector does not indicate a match for the result of the comparison during the time interval in which a gate signal is being output from the unique word/gate signal generator.

6. A unique word detecting circuit according to claim 3, wherein said error detector outputs a signal for stopping said unique word detection when the signal output from said pseudo noise detector indicates non-matching for the result of the comparison and the signal output from said unique word detector indicates non-matching for the result of the comparison.

7. A unique word detecting circuit according to claim 3, wherein said error detector outputs a signal for stopping said unique word detection when the signal output from said pseudo noise detector does not indicate a match for the result of the comparison, or when the signal output from said unique word detector does not indicate a match for the result of the comparison during the time interval in which a gate signal is being output from the unique word/gate signal generator.

\* \* \* \* \*